United States Patent
Melton

[15] 3,659,876
[45] May 2, 1972

[54] TRAILER HITCH

[72] Inventor: Johnnie D. Melton, Route 1, Barry, Tex. 75102

[22] Filed: Dec. 11, 1970

[21] Appl. No.: 97,247

[52] U.S. Cl. ..........................................280/511, 280/423 R
[51] Int. Cl. ...............................................................B60c 1/06
[58] Field of Search...................280/511, 512, 508, 509, 423, 280/434, 435

[56] References Cited

UNITED STATES PATENTS

| | | | |
|---|---|---|---|
| 2,634,987 | 4/1963 | Palmer | 280/512 |
| 2,998,268 | 8/1961 | Witter | 280/511 |
| 3,433,503 | 3/1969 | Davis | 280/423 R |

*Primary Examiner*—Benjamin Hersh
*Assistant Examiner*—Robert R. Song
*Attorney*—Cecil L. Wood and Peter J. Murphy

[57] ABSTRACT

A trailer socket assembly for coupling to an upstanding shank mounted ball of a towing vehicle includes an upstanding cylindrical socket body having a downward opening cylindrical recess for receiving the ball and shank. The body is provided with slots in a transverse plane adjacent to the lower end which open to the socket recess from opposite sides of the body. A pair of elongated locking arms pivotally mounted on the body are swingable into the slots to define a restriction of the socket opening to retain the ball therein. A spring biased locking bar movable transverse to the plane of the locking arms includes recesses for confining the arms against lateral outward movement to release the ball. The socket body is adapted to define a downward extension of a vertical tubular member of a gooseneck drawbar.

10 Claims, 6 Drawing Figures

Patented May 2, 1972
3,659,876
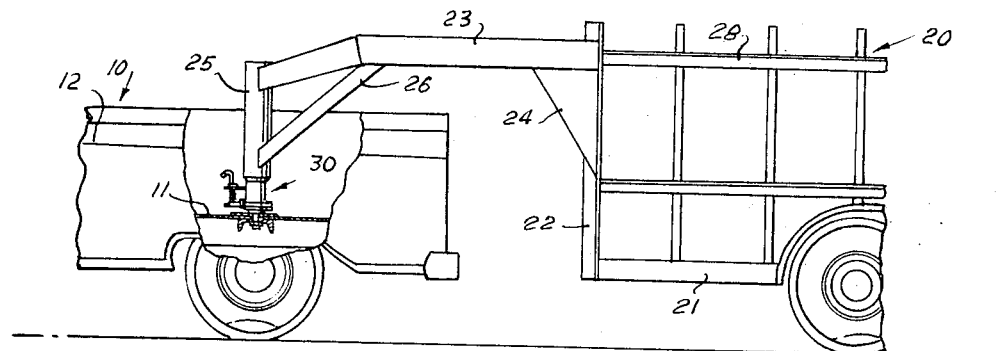
Fig. 1
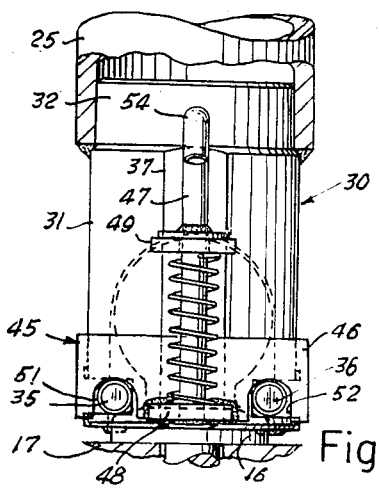
Fig. 5
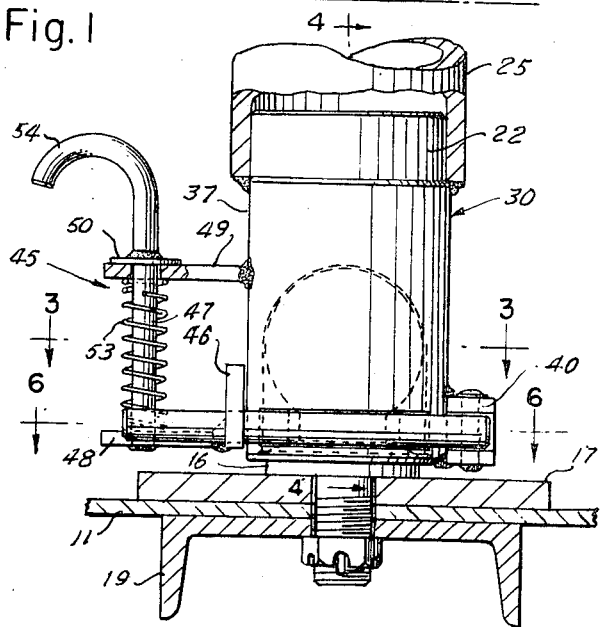
Fig. 2
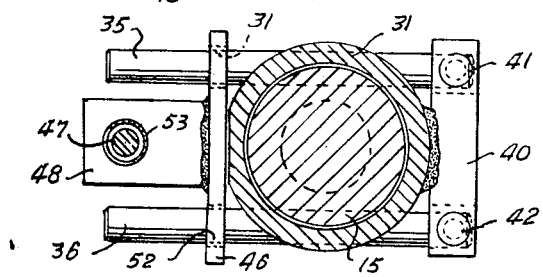
Fig. 3
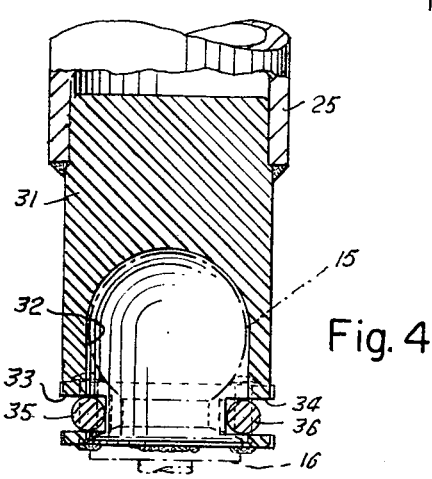
Fig. 4
Fig. 6
INVENTOR
Johnnie D. Melton
BY
ATTORNEYS

TRAILER HITCH

BACKGROUND AND SUMMARY OF THE INVENTION

This invention relates to the field of hitches or couplers for connecting towed trailers to towing vehicles such as trucks, automobiles or tractors; and more particularly to a trailer mounted socket assembly for coupling engagement with a ball member on the towing vehicle.

There are many known and proposed devices of this kind which are objectionable for a variety of reasons such as being complicated and expensive to manufacture, being not sufficiently rugged or sturdy for desired uses, being awkward or difficult in use in placing the trailer socket assembly over the towing ball assembly, and providing overly complicated or unsatisfactory locking or antirelease devices.

A principal object of this invention is to provide a trailer coupling or hitch which is of rugged construction, easy to couple and uncouple, of relatively simple construction for economy of manufacture, and certain and safe in operation.

Another object of this invention is to provide a ball and socket type trailer hitch assembly wherein the socket structure, which provides the trailer supporting and pulling function, is independent of the structure for locking the socket member to the ball member thereby providing for safe operation.

Another object of this invention is to provide a trailer hitch socket assembly which is particularly adapted for use with a gooseneck type drawbar, for coupling to a towing vehicle such as a pickup truck.

For accomplishing these objects a socket assembly includes an upstanding body having a cylindrical socket recess opening to the bottom of the body. Slots are provided in a transverse plane opening to the cylindrical recess from opposite sides of the body. A pair of locking arms are pivotally supported on the body to swing in the plane of the slots into and out of the slots. Locking means is mounted on the body for confining the locking arms within the slots whereby the locking arms define a restriction of the socket opening for retaining the socket ball therein.

The novel features and the advantages of the invention, as well as additional objects and advantages thereof, will be understood more fully from the following description when read in connection with the accompanying drawings.

DRAWINGS

FIG. 1 is a fragmentary view illustrating in part a trailer having a gooseneck drawbar towed by a pickup type truck;

FIG. 2 is a fragmentary side elevation of the hitch assembly as seen in FIG. 1;

FIG. 3 is a transverse sectional view through the hitch assembly taken in the plane 3—3 of FIG. 2;

FIG. 4 is a vertical sectional view of the hitch assembly taken in the plane 4—4 of FIG. 2;

FIG. 5 is a front view of the hitch assembly of FIG. 2; and

FIG. 6 is a transverse sectional view as viewed in the plane 6—6 of FIG. 4, showing one of the locking arms in the release position.

DESCRIPTION OF THE PREFERRED EMBODIMENT

The trailer hitch socket assembly according to the present invention is particularly adapted for use with a trailer having a gooseneck drawbar; and such use is illustrated in FIG. 1 of the drawing. FIG. 1 is a fragmentary view of the rear portion of a pickup type truck towing vehicle 10 and a tandem type trailer 20 which may include adjacent tandem axles positioned intermediate the ends of the trailer bed.

The pickup truck 10 may include a conventional bed 11 having side walls 12 and a down-swinging tailgate 13. A trailer hitch ball 15, of well-known configuration including a reduced diameter supporting neck and enlarged base 16, is mounted on the truck bed 11 over the rear axle and midway between the side walls 12. In order to support the trailer load, the bed may be beefed up with a strengthening plate 17 on the upper surface of the bed and possibly with other strengthening plates or channels 19 underneath the bed as necessary. The ball 15 may include an integral downwardly projecting threaded stud 18 by means of which the ball is removably secured to the truck, so that the ball may be removed from the truck bed when desired so as not to interfere with other uses of the truck. The hitch ball 15 is mounted in the indicated position over the truck axle to provide for better handling and maneuverability of the towed trailer.

The towed trailer includes, for example, a horizontal bed 21 supported on a suitable frame, upstanding front posts 22, and upstanding walls or racks 28.

A gooseneck drawbar preferably includes two horizontal members 23 which extend forwardly from two front corner posts 22, being secured to the upper ends of the corner posts which are suitably anchored to the trailer frame. The horizontal members 23 are further supported relative to the corner posts by means of gusset type braces 24. The horizontal drawbar arms 23 converge and meet at the center line of the trailer where they are secured as by welding to the upper end of the vertical tubular member 25 such as a 4-inch iron pipe for example. The vertical tubular member 25 is further secured to the horizontal arms 23 by means of angle braces 26 welded to the lower end of the vertical member and to the horizontal arms.

A hitch socket assembly 30, for coupling engagement with the hitch ball 15, includes a cylindrical, preferably steel body 31 designed to define a downward extension of the vertical member 25 of the gooseneck drawbar. For this purpose the body includes an upper reduced diameter boss 32 which is dimensioned to be received within the tubular member 25 for aligning the tubular member and body, and for facilitating the welding of the body to the tubular member.

The socket body 31 is provided with a cylindrical recess 32 opening from the bottom thereof and terminating in a semispherical upper surface within the body. The cylindrical recess and its associated semi-shperical upper surface are dimensioned to receive the spherical hitch ball 15 in a close fitting relationship to provide the desired support and swivel function of the trailer hitch.

For retaining the hitch ball within the socket recess, the body 31 is provided with a pair of slots 33 and 34 which are disposed in a transverse horizontal plane adjacent to the lower end of the body and are cut into the socket body from opposite sides thereof. As viewed from the top of the body, the bases of the slots 33 and 34 lie along chord lines which are parallel to each other and which are disposed in parallel relation to the longitudinal axis of the trailer and gooseneck drawbar. The slots 33 and 34 are formed in a manner to enter or intersect the socket recess 32 so that locking arms 35 and 36 may be positioned within the slots 33 and 34 respectively, and when positioned adjacent to the bases of the slots define a restriction of the socket recess. As best seen in FIG. 4, the slots are located, relative to the upper spherical surface of the socket recess, so that when the ball 15 is received in the socket recess, the reduced diameter neck of the hitch ball lies in the plane of the slots.

The locking arms may have the form of elongated rod members for example and are pivotally attached at one end to the body 31. For this purpose, an elongated hinge bar 40 is welded to the exterior of the body 31, this bar being disposed in the plane of the slots 33 and 34 and transverse to the bases of the slots. As seen in the drawings, the hinge bar 40 is preferably secured to the body 31 on the trailing side of the body in its relation to the gooseneck drawbar. The ends of the hinge bar are notched to define yokes for supporting vertical hinge pins 41 and 42 respectively; and the ends of the locking arms 35 and 36 are dimensioned to be received within the yokes and are provided with transverse holes for accommodating the hinge pins 41 and 42. In this manner the locking arms are hinged to swing in the horizontal plane of the slots 33 and 34; and the hinge pins are so arranged relative to the slots that when the arms are swung inward to the inner limiting position they extend generally parallel to each other and parallel to the bases of the slots 33 and 34. In this inner limiting position, as best seen in FIGS. 3 and 4, the locking arms lie within the cylindrical recess 32 and define a restriction of the recess opening; and this position of the locking arms is referred to as the locking position. As seen in FIG. 6, the arms may be swung laterally outward to a release position.

For maintaining the locking arms in the locking position, a locking bar assembly 45 includes an elongated plate-like bar 46 mounted for reciprocating movement in a vertical plane transverse to the plane of the slots 33 and 34 and generally parallel to the plane of the hinge pins 41 and 42. The bar is secured to the lower end of an operating shaft 47 by means of a transverse bracket 48; and the operating shaft is guided for vertical reciprocating movement by a bracket 49 welded to the body on the side opposite from that of the hinge bar 40. The bracket 49 is provided with a vertical bore for receiving and guiding the operating shaft 47. The plate-like bar 46 is guided in close relation to a longitudinal flat 37 on the body 31 to maintain the bar in the desired plane.

As best seen in FIGS. 5 and 6, the locking bar is provided with longitudinally spaced downward opening notches 51 and 52 which are spaced apart a distance corresponding to the distance between the locking arm hinges 41 and 42. When the locking arms are disposed in the locking position within the respective slots, the arms are retained in this position by movement of the locking bar downward wherein the free ends of the locking arms are received within the notches 51 and 52. The locking bar is normally urged to this downward position by means of a compression spring 53 which is confined between the locking bar bracket 48 and the lower surface of the body bracket 49.

The operating shaft 47 is provided with an upper transverse arm 54 by means of which the locking bar assembly 45 may be lifted to release the locking arms 35 and 36. A collar 50, fixed to the operating shaft, limits downward movement of the locking bar assembly through engagement with the upper surface of the bracket 49. This limiting function is desirable when the locking arms 35 and 36 are not in the locking position to prevent entry of the locking arms into the respective slots.

It will be noted that the locking bar assembly 45 is positioned at the forward or leading face of the socket assembly 30, in its relation to the gooseneck drawbar, so that the locking bar assembly may be conveniently operated for coupling or uncoupling the trailer to the towing vehicle.

The operation of the trailer hitch socket assembly may be summarized as follows: For coupling the trailer to a towing vehicle such as a pickup truck; the front of the trailer is preferably jacked up to a height wherein the lower end of the socket body 31 lies above the top of the pickup truck hitch ball 15. The pickup truck, with the tailgate 15 lowered, may then be backed under the gooseneck drawbar to align the ball with the socket body.

Prior to coupling the hitch parts, the locking bar assembly 45 will have been lifted and the locking arms 35 and 36 swung outward to prevent restriction of the socket recess 22. The locking arms will then be prevented from entering the respective slots 33 and 34 by the locking bar 46 which moves downward to an interference position in the plane of the slots; this position being maintained by the compression spring 53 and the operating shaft collar 54.

The front end of the trailer 20 is then lowered to permit seating of the socket body 31 on the hitch ball 15. Following this coupling of the hitch parts, the locking bar assembly is raised through lifting of the operating shaft arm 54, and the locking arms 35 and 36 are positioned within the respective slots 33 and 3 4. Upon release of the locking bar assembly 45, the biasing spring 53 moves the assembly downward wherein the locking bars are laterally confined within the respective locking bar notches 51 and 52. Since the locking arms are laterally confined by the locking bar and are vertically confined by the respective slots, the socket assembly cannot become disengaged from the hitch ball 15.

For uncoupling the hitch assembly, the locking bar assembly 45 is lifted and the locking arms swung outward, with the locking bar assembly then being released to prevent repositioning of the locking arms within the respective slots. The front of the trailer may then be lifted, either by jacking or otherwise, to vertically separate the hitch parts.

During towing operations, the pickup truck tailgate 33 may be latched in its upright position to secure materials which may be hauled in the truck bed; since the gooseneck drawbar is designed to permit normal towing operatin with the tailgate in the upright position.

What has been described is a simple and practical socket assembly particularly adapted for use with a gooseneck type drawbar for coupling a trailer to a hitch ball of a towing vehicle. Particular features of the invention are its rugged construction and its latching mechanism which is conveniently operated for coupling and uncoupling the trailer and which yet provides an effective mechanism for preventing uncoupling of the trailer from the towing vehicle.

While a preferred embodiment of the invention has been illustrated and described, it will be understood by those skilled in the art that changes and modifications may be resorted to without departing from the spirit and scope of the invention.

What is claimed is:

1. A trailer hitch socket assembly for coupling to an upstanding hitch ball having a reduced diameter supporting neck, comprising
    an upstanding body having a cylindrical recess opening to the bottom thereof; said body having slots on opposite sides thereof disposed in a transverse plane and opening to said cylindrical recess;
    a pair of locking arms pivotally supported on said body to swing in the plane of said slots into and out of said slots;
    and locking means mounted on said body for confining said locking arms within said slots, whereby said locking arms define a restriction of the recess opening for retaining the hitch ball therein.

2. A socket assembly as set forth in claim 1
    wherein said locking means includes a locking bar moveable in a plane transverse to the plane of said slots; said locking bar having recess means enclosing the free ends of said locking arms to restrain said arms against movement out of said slots.

3. A socket assembly as set forth in claim 2
    including spring means normally urging said locking bar to a position to enclose said locking arms.

4. A socket assembly as set forth in claim 1
    wherein said locking arms are elongated members each pivotally supported at one end on said body to swing into a respective slot in generally parallel relation with each other; said arms, in said parallel relation, being disposed partially within said cylindrical recess to define the restriction thereof; and said locking arms being swingable out of said parallel relation and out of said slots to permit ingress and egress of a coacting trailer hitch ball.

5. A socket assembly as set forth in claim 1
    wherein said cylindrical recess of said body includes an upper semi-spherical end surface for coacting engagement with a trailer hitch ball.

6. A socket assembly as set forth in claim 4
    wherein said locking means comprises a locking bar guided on said body for rectilinear movement in a plane transverse to the plane of said slots; said locking bar including recess means for enclosing said locking arms in said parallel relation thereof to restrain said arms from swinging movement out of said slots;
    and spring means normally urging said locking bar to a position to enclose said locking arms.

7. A socket assembly as set forth in claim 1
    wherein said slots are disposed in a plane adjacent to the lower end of said upstanding body;
    a hinge bar secured to said body defining spaced parallel hinge axes extending transverse to the plane of said slots and disposed at the ends of respective slots; said locking arms comprising elongated members having respective ends hinged at said hinge axes to swing in the plane of said slots to a locking position wherein said arms are disposed in parallel relation within said slots to define the recess opening restriction;

said locking means comprising a locking bar mounted on the side of said upstanding body opposite from said hinge bar for rectilinear sliding movement in a plane transverse to the plane of said slots; and said locking bar including recess means for confining the free ends of said locking arms against movement out of said locking position.

8. A socket assembly as set forth in claim 1 wherein said upstanding body includes means at its upper end for rigidly coupling said body to the drawbar assembly of a trailer.

9. A socket assembly as set forth in claim 1 wherein said upstanding body is formed from an elongated cylindrical member having a reduced diameter cylindrical boss at the upper end thereof adapted to be received in a tubular upright member of a trailer drawbar assembly.

10. A trailer hitch assembly as set forth in claim 1 wherein said upstanding body is a cylindrical body having an upwardly extending reduced diameter boss; a gooseneck drawbar including an upstanding tubular member and a transverse member attached to the upper end thereof; said socket body boss being received in said tubular member and said body being welded to said tubular member to define a downward extension thereof.

* * * * *